(12) United States Patent
Sagawa et al.

(10) Patent No.: US 9,418,440 B2
(45) Date of Patent: Aug. 16, 2016

(54) IMAGE SEGMENTING APPARATUS AND METHOD

(71) Applicant: CANON KABUSHIKI KAISHA, Tokyo (JP)

(72) Inventors: Naotsugu Sagawa, Tokyo (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 14/542,792

(22) Filed: Nov. 17, 2014

(65) Prior Publication Data

US 2015/0139546 A1 May 21, 2015

(30) Foreign Application Priority Data

Nov. 20, 2013 (JP) ................................. 2013-240232

(51) Int. Cl.
*G06K 9/34* (2006.01)
*G06T 7/00* (2006.01)
*G06T 7/40* (2006.01)

(52) U.S. Cl.
CPC ............. *G06T 7/0081* (2013.01); *G06T 7/0095* (2013.01); *G06T 7/402* (2013.01); *G06T 7/403* (2013.01); *G06T 2207/20084* (2013.01)

(58) Field of Classification Search
CPC . G06K 9/00771; G06K 9/6256; G06K 9/342; G06K 9/00536; G06K 9/3216; G06K 9/3241; G06K 9/34; G06T 3/0081; G06T 3/4038; G06T 5/009; G06T 5/40; G06T 7/0042; G06T 7/0065; G06T 7/0081; G06T 7/0083; G06T 7/0093; G06T 7/0095; G06T 7/0097; G06T 7/402; G06T 7/403; G06T 7/60; G06T 2207/10096; G06T 2207/20036; G06T 2207/20141; G06T 2207/20144; G06T 2207/30068; G06T 2207/30176; H04N 1/3876; H04N 1/4074; H04N 5/23238; H04N 5/2628; H04N 19/51; G06F 17/30799; G06F 17/30831
See application file for complete search history.

(56) References Cited

U.S. PATENT DOCUMENTS 6,424,752 B1 7/2002 Katayama et al.
6,549,681 B1 4/2003 Takiguchi et al.
(Continued)

FOREIGN PATENT DOCUMENTS

JP 2006-227973 A 8/2006

OTHER PUBLICATIONS

Everingham et al., "The PASCAL Visual Object Classes (VOC) Challenge," International Journal of Computer Vision, vol. 88, (2010) pp. 303-338.
(Continued)

*Primary Examiner* — Jose Couso
(74) *Attorney, Agent, or Firm* — Fitzpatrick, Cella, Harper & Scinto (57) ABSTRACT

An image processing apparatus has: a segmenting unit for segmenting an input image into a plurality of areas on the basis of a similarity of pixels; an acquiring unit for acquiring sizes of the segmented areas; a selecting unit for selecting one of a plurality of discriminating methods of discriminating, with respect to adjacent areas among the plurality of areas, on the basis of an acquired size of each of the adjacent areas, whether or not the adjacent areas are connecting targets by using different kinds of features; an extracting unit for extracting, from the adjacent areas, the feature of the kind which is used in the selected discriminating method; a connecting unit for connecting the adjacent areas determined as the connecting targets by the selected discriminating method; and a classifying unit for classifying a kind of connected area.

10 Claims, 11 Drawing Sheets

(56) References Cited

U.S. PATENT DOCUMENTS

| | | | |
|---|---|---|---|
| 6,608,926 B1 | 8/2003 | Suwa et al. | |
| 6,621,921 B1 | 9/2003 | Matsugu et al. | |
| 6,694,051 B1 | 2/2004 | Yamazoe et al. | |
| 6,704,041 B2 | 3/2004 | Katayama et al. | |
| 6,766,037 B1 * | 7/2004 | Le | G06K 9/342 382/107 |
| 7,672,484 B2 * | 3/2010 | Wiedemann | G06K 9/0063 382/103 |
| 7,756,317 B2 * | 7/2010 | Huo | G06T 7/0012 382/128 |
| 8,121,367 B2 * | 2/2012 | Socher | G06T 7/0083 382/128 |
| 8,737,740 B2 | 5/2014 | Tojo et al. | |
| 9,025,872 B2 * | 5/2015 | Yabu | G06T 7/0083 382/171 |

OTHER PUBLICATIONS

Socher et al., "Parsing Natural Scenes and Natural Language with Recursive Neural Networks," International Conference on Machine Learning, 2011, pp. 1-8.
Felzenszwalb et al., "Efficient Graph-Based Image Segmentation," International Journal of Computer Vision 59(2), (2004), pp. 167-181.
Achanta et al., "SLIC Superpixels," EPFL Technical Report 149300, Jun. 2010, pp. 1-15.

* cited by examiner

| AREA ID | NUMBER OF PIXELS |
|---|---|
| R01 | 430 |
| R02 | 650 |
| R03 | 1,200 |
| R04 | 610 |
| R05 | 520 |
| R06 | 60 |
| R07 | 52 |
| R08 | 63 |
| R09 | 1,000 |

FIG. 10

|  | R01 | R02 | R03 | R04 | R05 | R06 | R07 | R08 | R09 |
|---|---|---|---|---|---|---|---|---|---|
| R01 |  | ○ | × | ○ | ○ | × | × | × | × |
| R02 | ○ |  | ○ | ○ | × | × | × | × | × |
| R03 | × | ○ |  | ○ | × | ○ | ○ | ○ | ○ |
| R04 | ○ | ○ | ○ |  | ○ | ○ | × | × | ○ |
| R05 | ○ | × | × | ○ |  | × | × | × | × |
| R06 | × | × | ○ | ○ | × |  | ○ | × | ○ |
| R07 | × | × | ○ | × | × | ○ |  | ○ | ○ |
| R08 | × | × | ○ | × | × | × | ○ |  | ○ |
| R09 | × | × | ○ | ○ | × | ○ | ○ | ○ |  |

| AREA ID | NUMBER OF PIXELS |
|---------|------------------|
| R02 | 1,080 |
| R03 | 1,200 |
| R04 | 610 |
| R05 | 520 |
| R06 | 60 |
| R07 | 52 |
| R08 | 63 |
| R09 | 1,000 |

FIG. 15

|     | R02 | R03 | R04 | R05 | R06 | R07 | R08 | R09 |
|-----|-----|-----|-----|-----|-----|-----|-----|-----|
| R02 |     | ○   | ○   | ○   | ×   | ×   | ×   | ×   |
| R03 | ○   |     | ○   | ×   | ○   | ○   | ○   | ○   |
| R04 | ○   | ○   |     | ○   | ○   | ×   | ×   | ○   |
| R05 | ○   | ×   | ○   |     | ×   | ×   | ×   | ×   |
| R06 | ×   | ○   | ○   | ×   |     | ○   | ×   | ○   |
| R07 | ×   | ○   | ×   | ×   | ○   |     | ○   | ○   |
| R08 | ×   | ○   | ×   | ×   | ×   | ○   |     | ○   |
| R09 | ×   | ○   | ○   | ×   | ○   | ○   | ○   |     |

| AREA ID | NUMBER OF PIXELS |
|---|---|
| R02 | 1,080 |
| R03 | 1,200 |
| R04 | 610 |
| R05 | 520 |
| R06 | 112 |
| R07 | 52 |
| R08 | 63 |
| R09 | 1,000 |

FIG. 18

|  | R02 | R03 | R04 | R05 | R06 | R08 | R09 |
|---|---|---|---|---|---|---|---|
| R02 |  | ○ | ○ | ○ | × | × | × |
| R03 | ○ |  | ○ | × | ○ | ○ | ○ |
| R04 | ○ | ○ |  | ○ | ○ | × | ○ |
| R05 | ○ | × | ○ |  | × | × | × |
| R06 | × | ○ | ○ | × |  | ○ | ○ |
| R08 | × | ○ | × | × | ○ |  | ○ |
| R09 | × | ○ | ○ | × | ○ | ○ |  |

IMAGE SEGMENTING APPARATUS AND METHOD

BACKGROUND OF THE INVENTION

1. Field of the Invention

The present invention relates to an apparatus and a method for segmenting an image into a plurality of areas.

2. Description of the Related Art

In the related arts, a study to segment an image into a plurality of meaningful areas has been performed. For example, such a study has been performed with respect to a Segmentation task disclosed in M. Everingham, L. Van Gool, C. K. I. Williams, J. Winn, and A. Zisserman, "The PASCAL Visual Object Classes (VOC) challenge", International Journal of Computer Vision. Vol. 88(2), 2010 (hereinbelow, referred to as Literature 1). In such a process for segmenting an image, first, a method whereby an image is segmented into small areas constructed by a plurality of similar adjacent pixels called superpixels, a feature quantity is extracted from each of the divided areas, and the areas are integrated and classified on the basis of the extracted feature quantities has been proposed. For example, a method whereby each area is classified into a class such as sky, tree, road, or the like by a neural network which was previously learned has been disclosed in Richard Socher, Cliff Lin, Andrew Y. Ng, and Christopher D. Manning, "Parsing Natural Scenes and Natural Language with Recursive Neural Networks", ICML 2011 (hereinbelow, referred to as Literature 2). As a method of generating superpixels which are used as a preprocess, a clustering or a graph expression is used (for example, refer to Felzenszwalb, P., Huttenlocher, D., "Efficient graph-based image segmentation", International Journal of Computer Vision. 2004 (hereinbelow, referred to as Literature 3) and Radhakrishna Achanta, Appu Shaji, Kevin smith, Aurelien Lucchi, Pascal Fua, and Sabine Susstrunk, "SLIC Superpixels", EPFL Technical Report 149300, June 2010 (hereinbelow, referred to as Literature 4).

However, for example, in the case where an image is segmented into superpixels by the method disclosed in Literature 3 and the classification disclosed in Literature 2 is performed to the divided superpixels, the following problems occur.

First, according to the method disclosed in Literature 3, there is a case where the number of areas of the superpixels becomes very large as a result of the area segmentation. For example, when textures such as tree, grass, and the like exist in the whole image, an edge portion is liable to be segmented and a large quantity of areas are generated. On the other hand, since the process which is executed for the classification is very complicated, if the number of superpixels is large, it takes a long time for the process.

Also with respect to an area size, in the area segmentation according to the method disclosed in Literature 3, an edge is sensitively separated in an area having the textures. Therefore, as a result, not only the number of areas increases but also many small areas are generated. Further, in the classification disclosed in Literature 2, there is such a problem that, to an area of a small size, a discrimination precision deteriorates. This is because, in the classification, although a category is discriminated by various feature quantities which are extracted from the areas, the feature quantities which are extracted from the small area are not stable. For example, if there are noises in a pixel value, although an area of a large size is difficult to be subjected to such an influence by the noises, the small area is liable to be influenced and there is a case where a feature different from a feature which the user inherently wants to extract is extracted.

It is an aspect of the invention to simply classify an image into a plurality of meaningful areas at a high precision.

SUMMARY OF THE INVENTION

According to the aspect of the invention, there is provided an image processing apparatus comprising: a segmenting unit configured to segment an input image into a plurality of areas on the basis of a similarity of pixels; an acquiring unit configured to acquire sizes of the areas segmented by the segmenting unit; a selecting unit configured to select one of a plurality of discriminating methods of discriminating, with respect to adjacent areas among the plurality of areas, on the basis of a size of each of the adjacent areas acquired by the acquiring unit, whether or not the adjacent areas are connecting targets by using different kinds of features; an extracting unit configured to extract, from the adjacent areas, the feature of the kind which is used in the discriminating method selected by the selecting unit; a connecting unit configured to connect the adjacent areas determined as the connecting targets by the discriminating method selected by the selecting unit; and a classifying unit configured to classify a kind of area connected by the connecting unit.

Further features of the present invention will become apparent from the following description of exemplary embodiments with reference to the attached drawings.

DESCRIPTION OF THE EMBODIMENTS

Preferred embodiments of the present invention will now be described hereinbelow in accordance with the accompanying drawings. In the embodiments, an example in which an image is segmented into a plurality of meaningful areas is shown.

Figure 1:
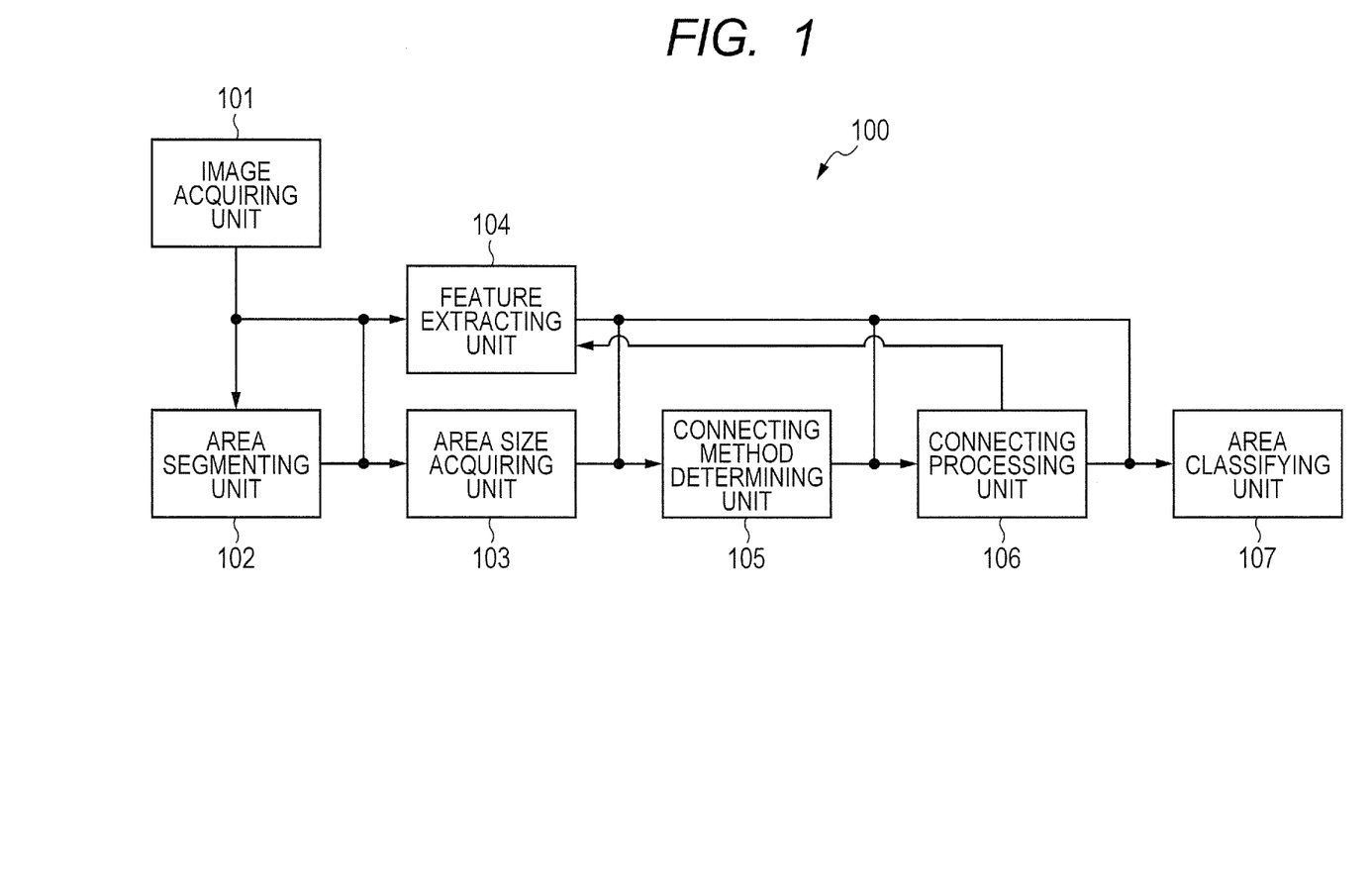
FIG. 1 is a block diagram illustrating an example of a functional construction of an image processing apparatus according to an embodiment of the invention.

FIG. 1 is a block diagram illustrating an example of a functional construction of an image processing apparatus 100 according to the embodiment. In FIG. 1, an image acquiring unit 101 is constructed by an imaging apparatus for acquiring image data and an image memory for storing the acquired image data. An area segmenting unit 102 segments an image into a plurality of areas comprising adjacent similar pixels. An area size acquiring unit 103 acquires information regarding a size of an area. A feature extracting unit 104 extracts an image feature in the area. A connecting method determining unit 105 determines a method of connecting the adjacent areas. A connecting processing unit 106 connects two areas serving as connecting targets. An area classifying unit 107 classifies a type (class) to which the area belongs. In this embodiment, a portion from the area segmenting unit 102 to the area classifying unit 107 is constituted by a general purpose computer.

The operation of the embodiment will be described hereinbelow. In the embodiment, first, an image is segmented into superpixels by the method disclosed in Literature 3 and the adjacent superpixels are subsequently connected. Further, a method of classifying a class of a connected area by the method disclosed in Literature 2 will be described.

Figure 2:
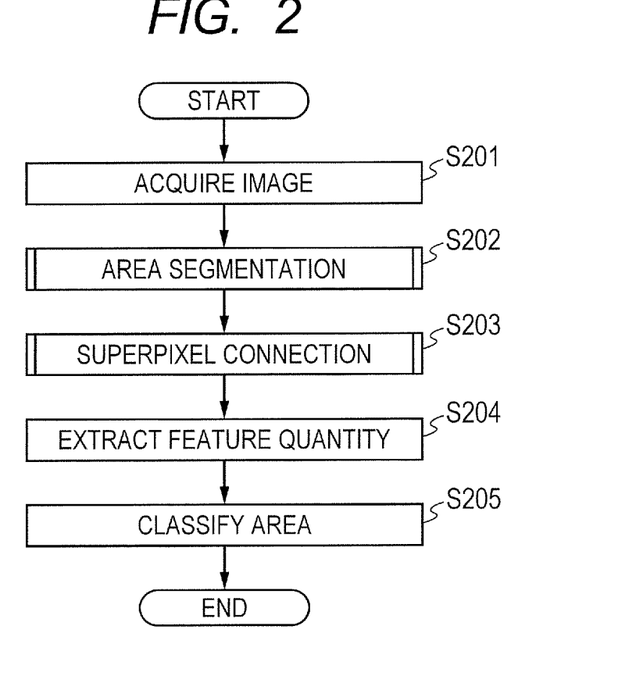
FIG. 2 is a flow chart illustrating an example of a processing procedure for acquiring an image and classifying an area.

FIG. 2 is a flow chart illustrating an example of a processing procedure for classifying an area by the image processing apparatus 100 according to the embodiment.

First, in step S201, the image acquiring unit 101 acquires an image and the acquired image is stored into an image memory. It is assumed that data of the image which is acquired is data of a color image based on three colors of RGB.

Subsequently, in step S202, the area segmenting unit 102 segments the image acquired in step S201 into areas and acquires a plurality of superpixels. Details of the process in this step will be described hereinafter. In step S203, the connecting processing unit 106 connects two adjacent superpixels among the superpixels acquired in step S202, thereby acquiring a connected area. In this step, with respect to the superpixels acquired by the area segmenting unit 102, the connecting processing unit 106 executes the connecting process on the basis of the feature extracted by the feature extracting unit 104, information acquired by the area size acquiring unit 103, and the connecting method determined by the connecting method determining unit 105. Details of the process will be described hereinafter.

Subsequently, in step S204, the feature extracting unit 104 extracts an area classification feature serving as a feature quantity for use in the area classification in step S205, which will be described hereinafter, from the connected area acquired in step S203. It is assumed that the area classification feature which is extracted in the embodiment is a color feature, a texture feature, a geometrical feature, and a position feature of the connected area. Each feature will be described hereinbelow.

The color feature is an average, dispersion, a strain degree, and a sharpness degree in the connected area in each color component of RGB. Although RGB is used as a color space in the embodiment, each color feature may be acquired by using another color space such as YCbCr, CIELAB, or the like. The texture feature is a feature obtained by a method whereby a luminance image (Y component of YCbCr) is subjected to a gavor filter process in a plurality of scales and directions and an average, dispersion, a strain degree, and a sharpness degree are calculated in the area with respect to a value obtained after the process. As another method, an average, dispersion, a strain degree, and a sharpness degree of a pixel in a connected area may be extracted to an image to which an LoG (Laplacian Of Gaussian) process has been executed in a plurality of scales and added.

The geometrical feature is an area (the number of pixels) in the area, a circumferential length (the number of pixels of an area boundary), a secondary moment of an x coordinate and a secondary moment of a y coordinate in the case where position coordinates of each pixel are expressed by (x, y), and an xy moment. The position feature is a center of gravity of each of an x coordinate and a y coordinate of the pixel in the connected area and a value of $(x_g^2+y_g^2)$ in the case where coordinates of the center of gravity are expressed by $(x_g, y_g)$. Assuming that the number of feature quantities which are extracted from one connected area is equal to d, those extracted feature quantities are held as d-dimensional feature vectors into a memory in a computer (not shown) for every area.

Figure 3:
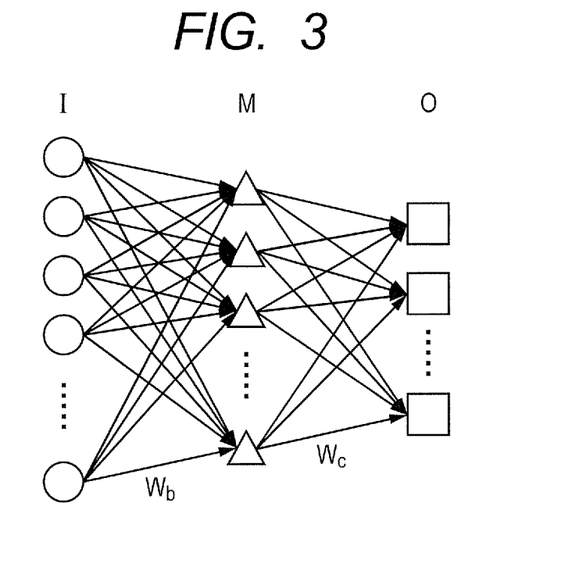
FIG. 3 is a diagram for describing RNN (Recursive Neural Networks) of a 3-layer structure.

Subsequently, in step S205, the area classifying unit 107 discriminates the class to which each of the connected areas belongs on the basis of the feature quantities extracted in step S204. The class discrimination is performed by RNN (Recursive Neural Networks) of a 3-layer structure as illustrated in FIG. 3. In FIGS. 3, I, M, and O denote neurons of an input layer, a middle layer, and an output layer, respectively. Assuming that the feature quantities (d-dimensional feature vectors) extracted in step S204 are set to $F_{raw}$, the number of neurons of the input layer I is equal to d. One feature quantity serving as one component of each feature vector is input and is transmitted as it is to the middle layer M. Assuming that the number of middle layers M is equal to $d_m$ and features which are output are set to $F_{sem}$, the features $F_{sem}$ are $d_m$-dimensional feature vectors and are calculated by the following equation (1)

$$F_{sem}=f(W_b F_{raw}) \qquad (1)$$

Where, $W_b$ denotes a matrix of $(d \times d_m)$ showing connecting coefficients of the input layer I and the middle layer M, and f denotes a sigmoid function. In the output layer O, $d_O$ values $F_{out}$ ($d_O$-dimensional feature vectors) are calculated by the following equation (2) and are output.

$$F_{out}=W_c F_{sem} \qquad (2)$$

Where, $W_c$ denotes a matrix of $(d_m \times d_O)$ showing connecting coefficients of the middle layer M and the output layer O and $d_O$ denotes the number of classes which are discriminated. Now, $W_b$ and $W_c$ are determined by a pre-learning by using the method disclosed in Literature 2. Each component of the feature quantities $F_{out}$ which are output from the output layer O corresponds to each class and the area classifying unit 107 outputs the class, as a discrimination result, which returns the largest value among the classes.

Subsequently, details of the process in step S202 in FIG. 2 will be described. In the embodiment, an example according to the method disclosed in Literature 3 using the graph expression will be described as an area segmenting process of the image.

Figure 4:
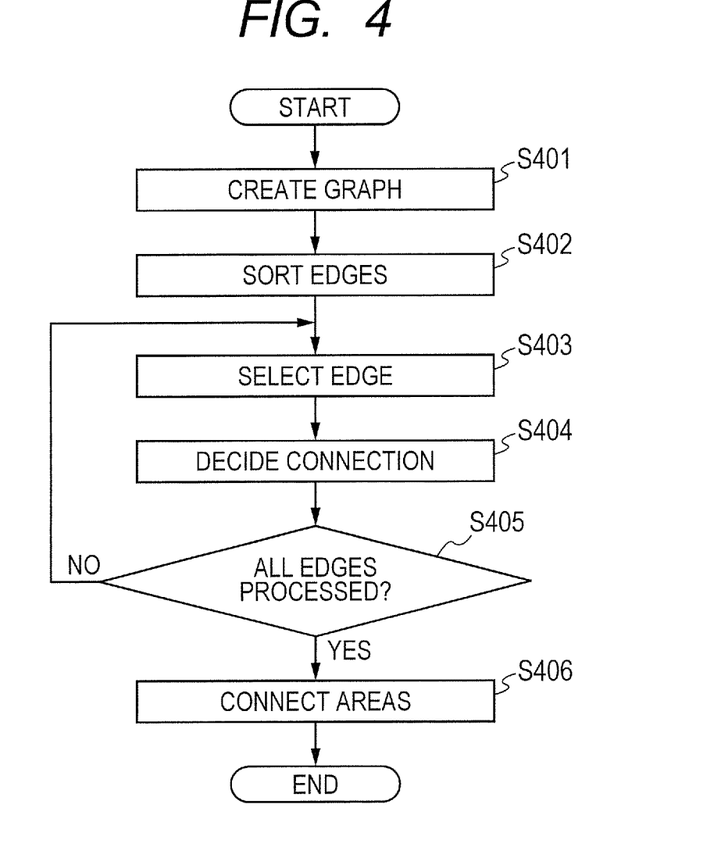
FIG. 4 is a flow chart illustrating an example of a processing procedure for segmenting into areas.

FIG. 4 is a flow chart illustrating an example of a processing procedure in which the area segmenting unit 102 segments the area on the basis of the method disclosed in Literature 3.

First, in step S401, the area segmenting unit 102 creates a graph in which each pixel of the input image is set to a vertex and combinations of each pixel and adjacent pixels in the eight circumferential directions are set to edges. In step S402, the area segmenting unit 102 calculates weights of all edges of the graph created in step S401 and sorts them in order from the small weight of the edge. A weight $w_{ij}$ of the edge is calculated by the following equation (3).

$$W_{ij} = \sqrt{(R_i - R_j) + (G_i - G_j)^2 + (B_i - B_j)^2} \quad (3)$$

Where, $(R_i, G_i, B_i)$ and $(R_j, G_j, B_j)$ denote RGB components of the pixels corresponding to vertices i and j of each edge. That is, it is assumed that distances in the RGB color spaces of the two pixels are set to edge weights.

Subsequently, in step S403, the area segmenting unit 102 selects the edge having the smallest weight from the graph created in step S401 with reference to a result of the sorting in step S402. In step S404, the area segmenting unit 102 searches the area including the pixel with respect to each pixel corresponding to the vertex of the edge selected in step S403 and decides the connection of the areas. It is assumed that in an initial state, the area is the pixel itself. The area segmenting unit 102 makes the connection decision of the areas on the basis of a comparison between a difference of the feature quantities between the two areas and a difference of the feature quantities in each area and uses the edge weights calculated in step S402. A difference $\text{Dif}(C_i, C_j)$ between the areas is calculated by the following equation (4).

$$\text{Dif}(C_i, C_j) = \min w_{kl} \quad (4)$$

Where, $C_i$ and $C_j$ denote two areas which are discriminated and min $w_{kl}$ denotes a minimum value of the edge weights calculated in step S402 among the edges of a vertex (pixel here) k belonging to the area $C_i$ and a vertex (pixel here) l belonging to the area $C_j$. A difference $\text{MInt}(C_i, C_j)$ in the area is calculated by the following equation (5).

$$\text{MInt}(C_i, C_j) = \min\{\text{Int}(C_i) + \tau(C_i), \text{Int}(C_j) + \tau(C_j)\} \quad (5)$$

Where, $\text{Int}(C) = \max(w_{kl})$ and is the maximum value of the edge weights calculated in step S402 among the edges of the two vertices belonging to the area C, that is, the vertex (pixel here) k and the vertex (pixel here) l. $\tau(C) = Kc/|C|$, $|C|$ denotes an area of the area C, and Kc denotes a parameter to control easiness of the connection of the areas. When the difference $\text{Dif}(C_i, C_j)$ between the areas is larger than the difference $\text{MInt}(C_i, C_j)$ in the area, it is determined that the difference between the areas is large, and the connection is not performed. On the other hand, in the other cases, it is determined that the two areas are similar, and the areas are connected. In the case of connecting the areas, to the area obtained after the connection, Int(C) is updated.

Subsequently, in step S405, the area segmenting unit 102 discriminates whether or not the process has been executed to all edges. If there are edges which are not processed yet, the processing routine is returned to step S403 and the process is repeated. On the other hand, as a result of the discrimination in step S405, if the process has been executed to all edges, the processing routine advances to step S406. In step S406, the area segmenting unit 102 acquires area sizes with respect to all areas and connects the areas of a predetermined size or less to the circumferential areas.

Figure 8:
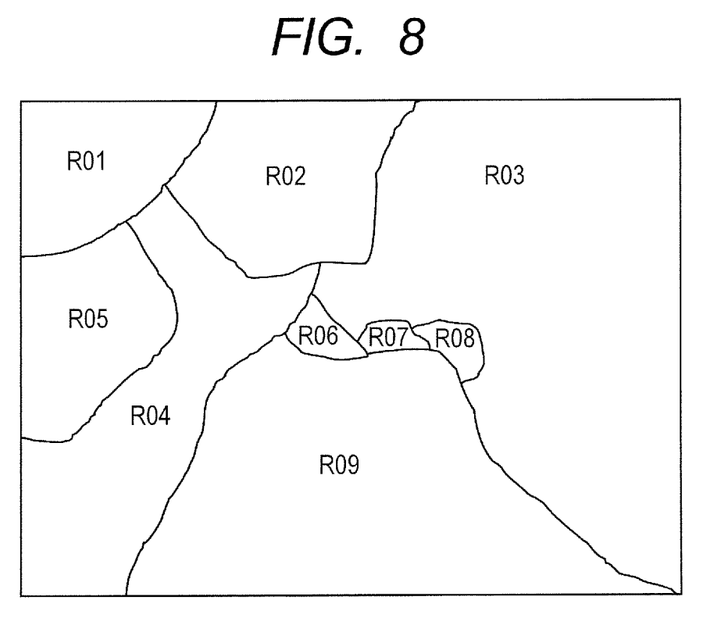
FIG. 8 is a diagram illustrating an example of an image segmented into superpixels.

Subsequently, the selection of a connecting deciding method based on the area sizes as a feature of the embodiment will be described in detail with reference to a flow chart of FIG. 5. In the embodiment, in order to simplify a description, with respect to a case where an input image has been divided into nine superpixels as illustrated in FIG. 8, a method of the connecting process of those superpixels will be described. It is now assumed that area IDs R01 to R09 have been allocated to the superpixels.

Figure 5:
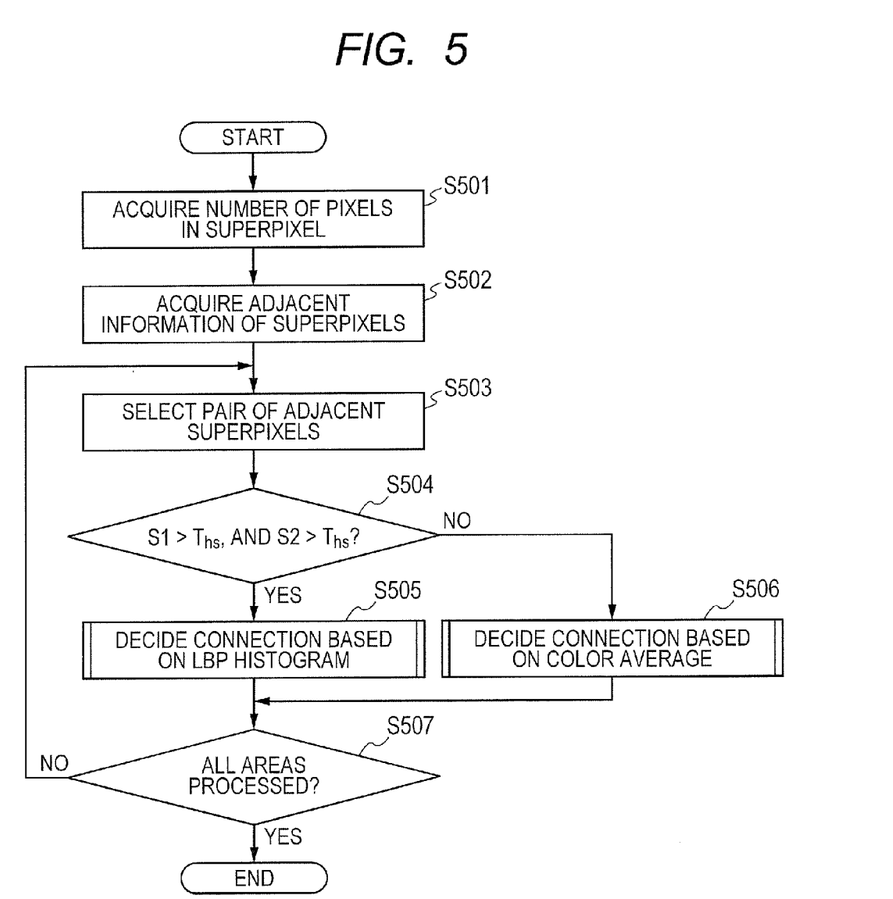
FIG. 5 is a flow chart illustrating an example of a detailed processing procedure for acquiring a connected area by connecting superpixels.

FIG. 5 is a flow chart illustrating an example of a detailed processing procedure for acquiring a connected area by connecting the superpixels in step S203 in FIG. 2.

Figure 9:
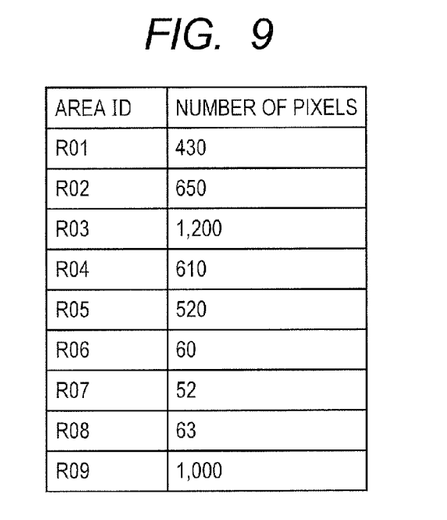
FIG. 9 is a diagram illustrating an example of a table showing the number of pixels per superpixel.

First, in step S501, the area size acquiring unit 103 acquires the number of pixels in each superpixel. FIG. 9 illustrates a table showing a relation between the area IDs shown in FIG. 8 and the number of pixels corresponding thereto.

Figure 10:
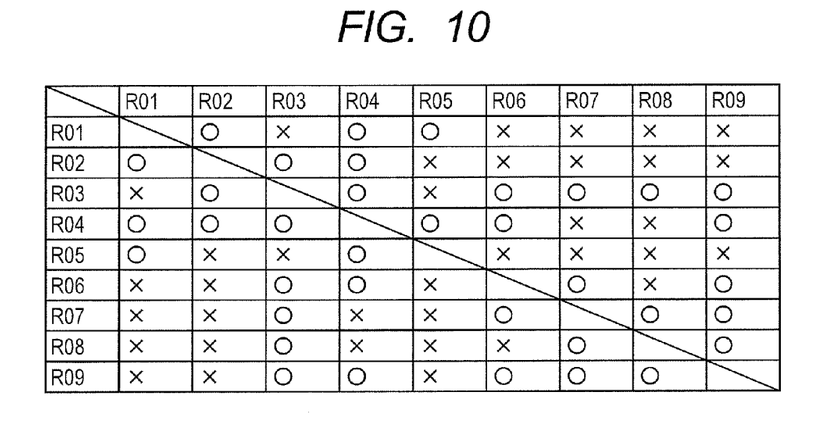
FIG. 10 is a diagram illustrating an example of a table showing an adjacent relation between superpixels.

Subsequently, in step S502, the area size acquiring unit 103 acquires adjacent information of the superpixels. First, the pixels are referred to in order from the upper left position to the lower right position of the image. When the area IDs of the adjacent pixels (right pixel, lower right pixel, lower pixel) are different, by checking those different area IDs, the adjacent information can be obtained. FIG. 10 illustrates an example of the adjacent information which is acquired from the image illustrated in FIG. 8. For example, since the superpixel R01 is adjacent to the superpixels R02, R04, and R05, "○" is allocated to a corresponding portion in the table illustrated in FIG. 10 as information showing that two areas are adjacent to each other. On the other hand, "×" is allocated as information showing that such a superpixel is not adjacent to the other areas. Since the table illustrated in FIG. 10 is symmetrical with respect to an oblique line, only portions upper (or lower) than the oblique line are referred to in the subsequent steps.

Subsequently, in step S503, the connecting method determining unit 105 selects a pair of one set of adjacent superpixels. In the embodiment, on the basis of the table illustrated in FIG. 10, the pairs of the superpixels are sequentially processed in order of the area IDs. Specifically speaking, the superpixels are sequentially scanned from the upper left position to the lower right position in the table illustrated in FIG. 10 like (R01 and R02), (R01 and R04), (R01 and R05), (R02 and R03), (R02 and R04), . . . and the pairs of the superpixels corresponding to "○" are sequentially selected. In the subsequent description, the pairs of the superpixels which are selected in this step are called Sp-G1 and Sp-G2, respectively.

Subsequently, in step S504, the connecting method determining unit 105 performs a classification to decide the connecting process which is executed in the next step in accordance with the size, that is, the number of pixels of each area of the pairs of the superpixels selected in step S503. Even if the texture feature is extracted from the small area, the stable feature quantities cannot be acquired due to noises or the like. Therefore, from such an area, the connecting process is executed by using low-dimensional feature quantities of a simple process instead of the texture feature which requires a high-dimensional complicated calculation.

In step S504, the connecting method determining unit 105 discriminates whether or not the conditions of the following expression (6) are satisfied in the case where the number of pixels of Sp-G1 is equal to S1, the number of pixels of Sp-G2 is equal to S2, and a threshold value is set to $T_{hs}$. As a result of the discrimination, if the conditions of the following expression (6) are satisfied, step S505 follows. If NO, step S506 follows.

$$S1 > T_{hs} \text{ and } S2 > T_{hs} \quad (6)$$

In step S505, the connecting method determining unit 105 makes a connection decision on the basis of an LBP histogram which is calculated by the feature extracting unit 104 with respect to the pairs of the superpixels selected in step S503. A process will be described in detail hereinbelow with reference to a flow chart of FIG. 6.

Figure 6:
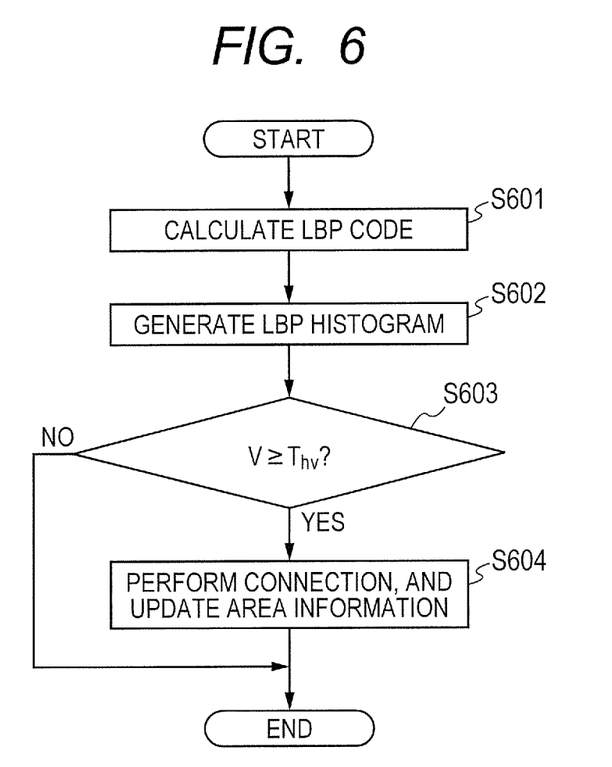
FIG. 6 is a flow chart illustrating an example of a detailed processing procedure for making a connection decision on the basis of an LBP histogram.

FIG. 6 is a flow chart illustrating an example of a detailed processing procedure for deciding the connection on the basis of the LBP histogram in step S505 in FIG. 5.

First, in step S601, the feature extracting unit 104 calculates an LBP (Local Binary Pattern) code as an image feature in the superpixel. First, a difference between the target pixel and each of its eight adjacent pixels is examined. If the difference is negative, "0" is allocated. If the difference is positive, "1" is allocated. A train of "0" and "1" is extracted so as to rotate from a predetermined start point and is arranged as a train of 8 bits, thereby forming a code and calculating the LBP code.

Figure 11:
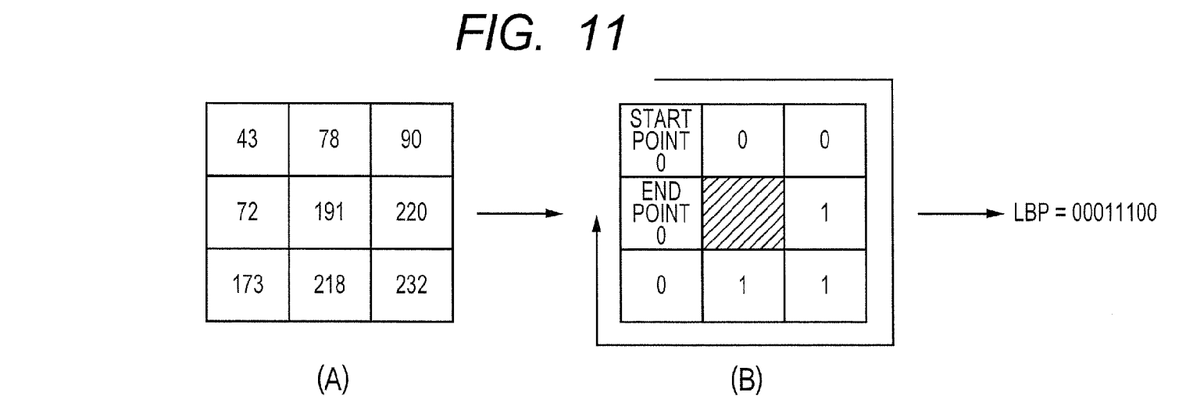
FIG. 11 is a diagram illustrating an example of a specific calculating method of an LBP code.

FIG. 11 is a diagram illustrating an example of a specific calculating method of the LBP code. (A) illustrates an example of pixel values of (3×3) pixels. (B) illustrates a result in the case where the target pixel is set to a center pixel and the adjacent pixels are converted into "0" or "1" on the basis of a difference from the target pixel. In the embodiment, the feature extracting unit 104 generates the LBP code by using a value of a luminance value Y obtained by converting the RGB values by the following equation (7).

$$Y = 0.299 \times R + 0.587 \times 0.114 \times B \quad (7)$$

In FIG. 11, in (B), the upper left pixel is set to a start point, the pixel under such a pixel is set to an end point, and a train of "0" and "1" is extracted in the direction shown in (B). Thus, "00011100" becomes the LBP code to the pixels illustrated in (A). In this step, with respect to all pixels in the two superpixels selected in step S505, the feature extracting unit 104 calculates the LBP codes by the foregoing method.

Subsequently, in step S602, the feature extracting unit 104 counts the number of pixels in the superpixel corresponding to the LBP code calculated in step S601, thereby generating a histogram. This histogram is hereinbelow called an LBP histogram.

Figure 12:
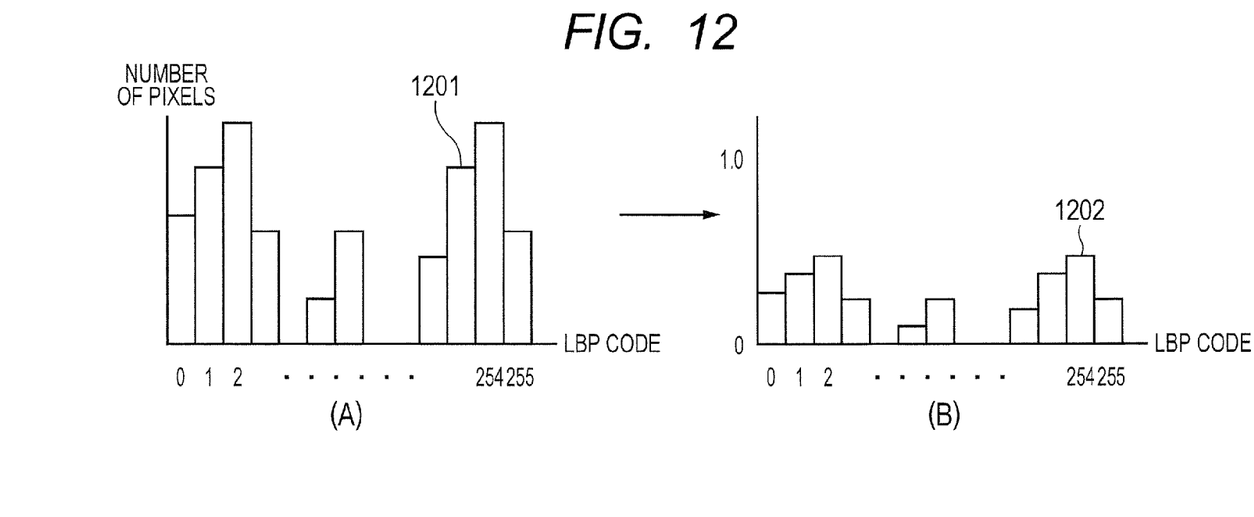
FIG. 12 is a diagram illustrating an example of the LBP histogram.

FIG. 12 is a diagram illustrating an example of the LBP histogram in the embodiment. In the embodiment, since a binary code of 8 digits is created as an LBP code, the number of bins of the histogram is equal to 256 (0 to 255). An LBP histogram 1201 illustrated in (A) is a result obtained by collecting the number of pixels to each bin. In the subsequent steps, although the LBP histograms of two superpixels are compared, since the number of pixels in the area differs every superpixel, it is necessary to normalize the histogram value by the number of pixels. Therefore, an LBP histogram 1202 after the normalization illustrated in (B) is further created.

Subsequently, in step S603, the connecting method determining unit 105 compares the LBP histograms of the two superpixels created in step S602 and decides whether or not those superpixels are connected. Such a decision can be made by the method using a histogram intersection disclosed in the Official Gazette of Japanese Patent Application Laid-Open No. 2006-227973. According to the histogram intersection, with respect to each element of the two histograms which are compared, the smaller value is used, a sum is acquired for all elements about such a value, and if the sum is large, it is evaluated that a degree of similarity is high. A degree V of similarity which is defined in the histogram intersection in the case where one set of histograms I and M including n bins are given is defined as follows. In the embodiment, since the number of bins is equal to 256 as mentioned above, the degree V of similarity is calculated by the following equation (8) on the assumption that n=256.

$$V = \sum_{j=0}^{n-1} \min(I_j, M_j) \quad (8)$$

Subsequently, the degree V of similarity of the two superpixels calculated by the equation (8) is compared with the predetermined threshold value $T_{hv}$. When the degree V of similarity is equal to or larger than the threshold value $T_{hv}$, it is decided that the two superpixels are similar, and step S604 follows. If the degree V of similarity is less than the threshold value $T_{hv}$, it is decided that the two superpixels are not similar, the connecting process is not executed, and the processing routine advances to step S507 in FIG. 5.

In step S604, the connecting processing unit 106 connects the two superpixels and forms a new area. At this time, a result obtained by adding the numbers of pixels of the two superpixels is set to the number of pixels of the new area. It is assumed that an area ID of the new area takes over one of the two superpixels. For example, the area ID of the superpixel of the larger size is taken over. On the basis of the LBP codes corresponding to the two superpixels acquired in step S601, the feature extracting unit 104 acquires an LBP histogram in the connected area which was newly generated in a manner similar to the procedure performed in step S602.

Figure 13:
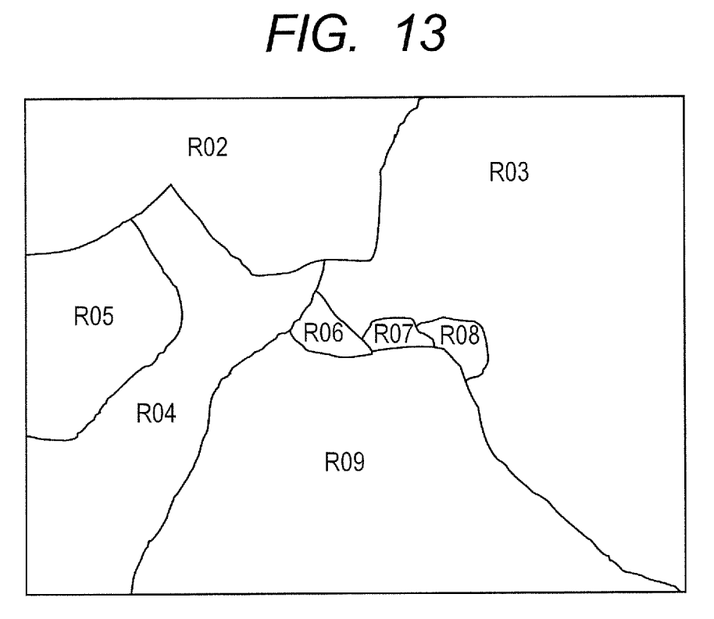
FIG. 13 is a diagram illustrating an example of an area obtained after areas were connected on the basis of the LBP histogram.

FIG. 13 illustrates an example of a result obtained by connecting Sp-R01 and Sp-R02 in FIG. 8 by the above-described method. In the example illustrated in FIG. 13, since the size of the area Sp-R02 is larger than that of Sp-R01, an ID of a connected area which is newly formed is equal to R02. The table illustrated in FIG. 9 is updated to a table illustrated in FIG. 14 by the connecting process by the area size acquiring unit 103. Similarly, the table illustrated in FIG. 10 is updated to a table illustrated in FIG. 15. When the process of step S604 is finished, the processing routine advances to step S507 in FIG. 5.

In the embodiment, although the LBP histograms using the luminance values have been used in the connection decision of the area of the predetermined size or more, LBP histograms based on RGB values may be generated. Besides the LBP feature, any feature such as gavor feature which has already been described, texton feature comprising a combination of a plurality of filters showing a texture feature, or the like may be used so long as it is a feature quantity which can express the texture information in the area.

Returning to the description of FIG. 5, in step S506, the connecting method determining unit 105 makes the connection decision on the basis of color averages with respect to the two pairs of superpixels selected in step S503. Details will be described hereinbelow with reference to a flow chart illustrated in FIG. 7. A case where superpixels R06 and R07 (hereinbelow, referred to as Sp-R06, Sp-R07) in FIG. 8 are used as targets of the connection decision will be described hereinbelow.

Figure 7:
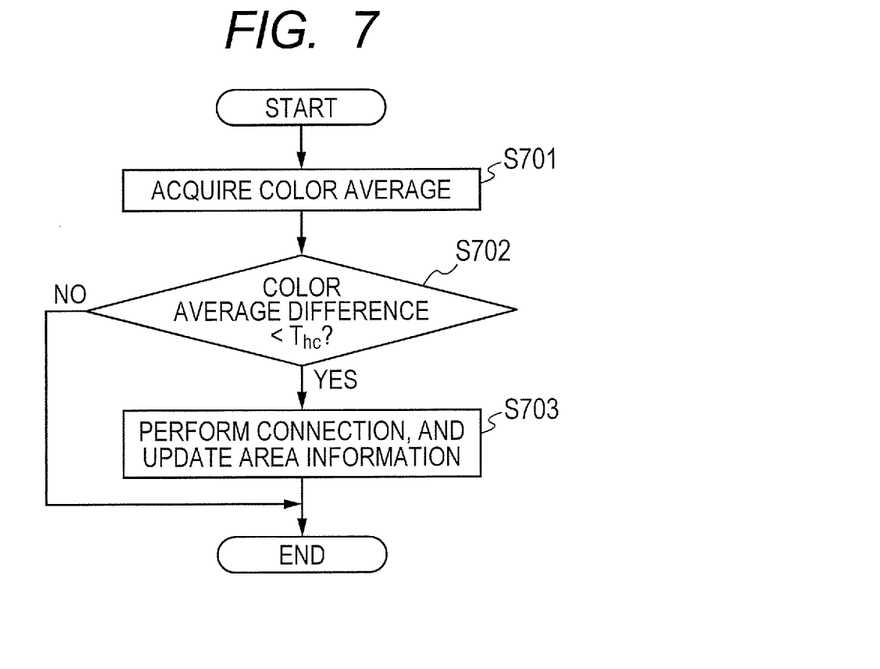
FIG. 7 is a flow chart illustrating an example of a detailed processing procedure for making a connection decision on the basis of color averages.

FIG. 7 is the flow chart illustrating an example of a detailed processing procedure for making the connection decision on the basis of the color averages in step S506 in FIG. 5.

First, in step S701, the feature extracting unit 104 calculates the color averages in Sp-R06 and Sp-R07 by the following equation (9), respectively.

$$(A_r, A_g, A_b) = \frac{1}{P} \times \left( \sum_{i \subset M} Ri, \sum_{i \subset M} Gi, \sum_{i \subset M} Bi \right) \quad (9)$$

Where, $A_r$, $A_g$, and $A_b$ denote average values of the R, G, and B colors and P indicates the number of pixels in the target superpixel. M denotes a set showing all pixels in the target superpixel and Ri, Gi, and Bi denote values of R, G, and B of a pixel i, respectively. A description will be made hereinbelow on the assumption that color averages of Sp-R06 are $A_r$(R06), $A_g$(R06), and $A_b$(R06) and color averages of Sp-R07 are $A_r$(R07), $A_g$(R07), and $A_b$(R07), respectively.

Subsequently, in step S702, the connecting method determining unit 105 calculates a difference Dif_c between the color averages of Sp-R06 and Sp-R07 by the following equation (10) and a calculation result is compared with the threshold value $T_{hc}$.

$$\text{Dif\_c} = \sqrt{(A_r(R07) - A_r(R06))^2 + (A_g(R07)A_g(R06))^2 + (A_b(R07) - A_b(R06))^2} \quad (10)$$

As a result of the comparison, if the difference Dif_c between the color averages is less than the threshold value $T_{hc}$, it is decided that the two superpixels are similar, and the processing routine advances to step S703. On the other hand, as a result of the comparison in step S702, if the difference Dif_c between the color averages is equal to or larger than the threshold value $T_{hc}$, it is decided that the two superpixels are not similar, and the connecting process is not executed but the processing routine advances to step S507 in FIG. 5.

In the foregoing description, although the color averages are used in the connection decision of the small area, the invention is not particularly limited to the color averages but any values may be used so long as they are low-dimensional feature quantities which are relatively stable to an area in which the number of pixels is small. For example, dispersion values of the color, edge information of an area boundary, edge intensity average value in the area, dispersion values, or the like can be also used.

Figure 14:
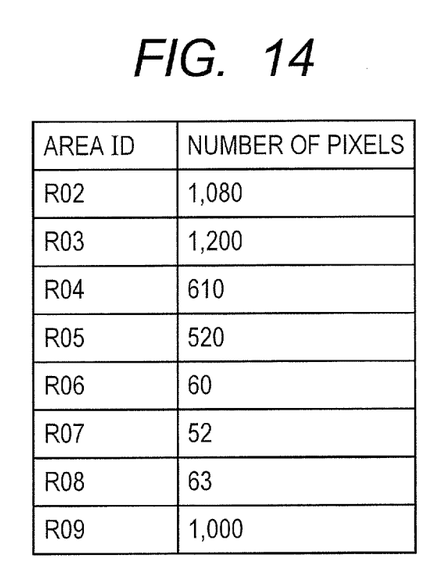
FIG. 14 is a diagram illustrating an example of a table showing the number of pixels of each area obtained after areas were connected on the basis of the LBP histogram.
Figure 15:
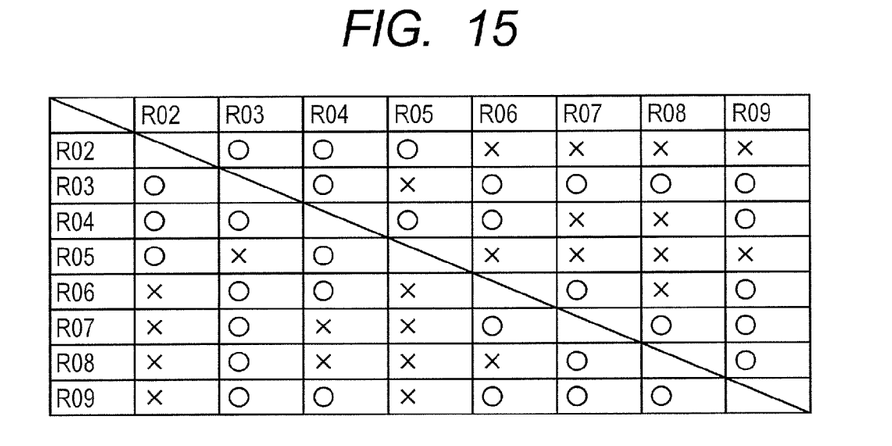
FIG. 15 is a diagram illustrating an example of a table showing an adjacent relation between the areas each obtained after areas were connected on the basis of the LBP histogram.
Figure 16:
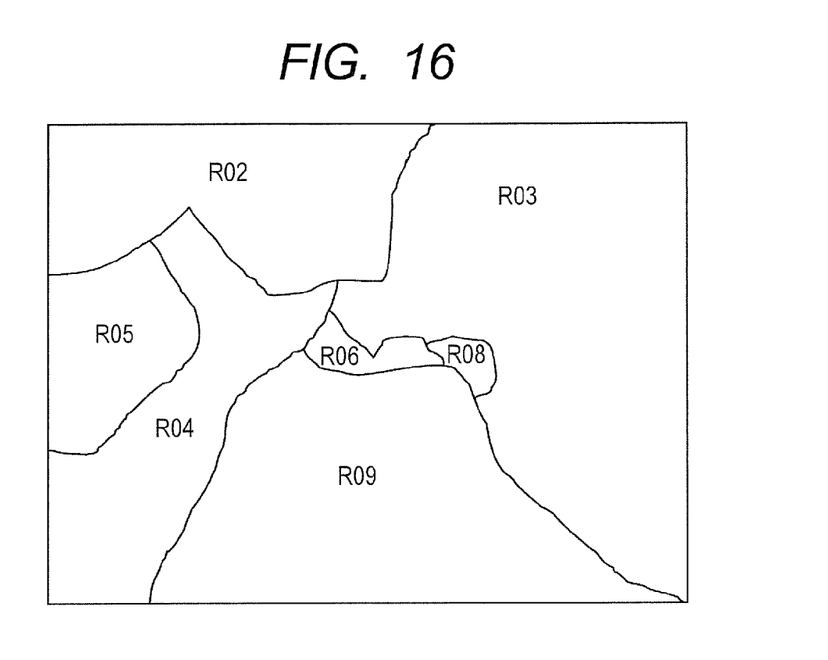
FIG. 16 is a diagram illustrating an example of an area obtained after areas were connected on the basis of the color averages.
Figure 17:
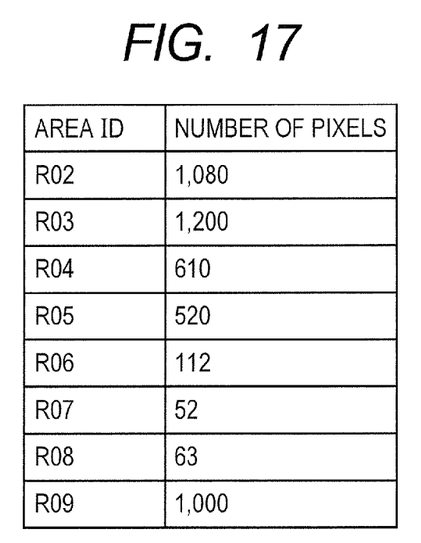
FIG. 17 is a diagram illustrating an example of a table showing the number of pixels of each area obtained after areas were connected on the basis of the color averages.
Figure 18:
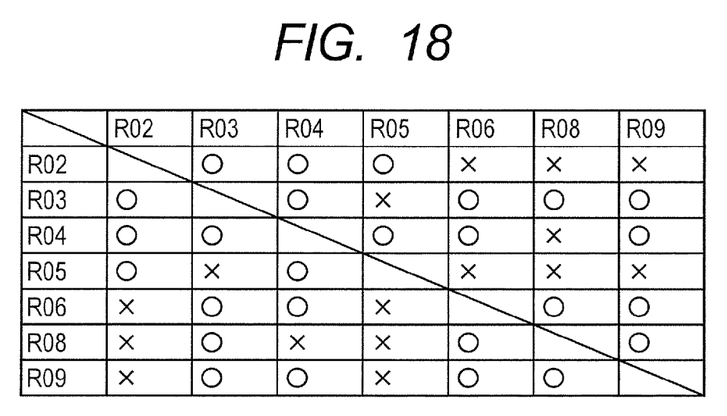
FIG. 18 is a diagram illustrating an example of a table showing an adjacent relation between the areas each obtained after areas were connected on the basis of the color averages.

In step S703, the connecting processing unit 106 forms a new area by connecting the two superpixels. Since the process in this step is similar to that in step S604 except for a point that the LBP histograms in step S604 are replaced by the color averages, its description is omitted here. FIG. 16 illustrates an example of results obtained by connecting Sp-R06 and Sp-R07 in FIG. 13. In the example illustrated in FIG. 16, since the size of the area Sp-R06 is larger than that of the area Sp-R07, an area ID of an area which is newly formed is set to R06. The table illustrated in FIG. 14 is updated to a table illustrated in FIG. 17 by the connecting process by the area size acquiring unit 103. Similarly, the table illustrated in FIG. 15 is updated to a table illustrated in FIG. 18. When the process of step S703 is finished, the processing routine advances to step S507 in FIG. 5.

Returning to the description of FIG. 5, subsequently, in step S507, the connecting method determining unit 105 discriminates whether or not the connection decision has been made with respect to the pairs of all superpixels. As a result of the discrimination, if the pairs of superpixels which are not processed yet still remain, the processing routine is returned to step S503. If the pairs of all superpixels have been processed, the processing routine advances to step S204 in FIG. 2.

Although the embodiment is constructed in such a manner that when the connecting process of at least one time has been executed with respect to all superpixels, the process is finished. On the other hand, the processes in steps S503 to S507 may be repeated until the number of pixels of the superpixels is equal to a predetermined value. That is, to the connected area, the connection decision may be further performed with respect to further other superpixels or other connected areas. In this case, although the number of processing times increases, since only the connected areas of a predetermined size or larger can be acquired as connected areas, a recognition precision at the post stage can be further improved.

As mentioned above, according to the embodiment, when the two superpixels are connected, the connecting process is controlled in accordance with the number of pixels in the area. Thus, excessive processes are not executed to the small area and the connecting process in which importance is attached to the precision can be executed to the other areas. Therefore, the process can be executed while keeping a balance between the precision and the processing speed, so that the area recognizing process can be easily executed at a high precision.

According to the embodiment described above, the image can be segmented into a plurality of meaningful areas at a high precision without taking a long processing time for classification of the area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240232, filed Nov. 20, 2013, which is hereby incorporated by reference herein in its entirety.

What is claimed is:

1. An image processing apparatus comprising:
   a segmenting unit configured to segment an input image into a plurality of areas on the basis of a similarity of pixels;

an acquiring unit configured to acquire sizes of the areas segmented by the segmenting unit;

a selecting unit configured to select one of a plurality of discriminating methods of discriminating, with respect to adjacent areas among the plurality of areas, on the basis of a size of each of the adjacent areas acquired by the acquiring unit, whether or not the adjacent areas are connecting targets by using different kinds of features;

an extracting unit configured to extract, from the adjacent areas, the feature of the kind which is used in the discriminating method selected by the selecting unit;

a connecting unit configured to connect the adjacent areas determined as the connecting targets by the discriminating method selected by the selecting unit; and a classifying unit configured to classify a kind of area connected by the connecting unit.

2. The image processing apparatus according to claim 1, wherein when the size of each of the adjacent areas is larger than a predetermined threshold value, the selecting unit selects a first discriminating method of discriminating by using a high-dimensional feature, and otherwise, the selecting unit selects a second discriminating method of discriminating by using a low-dimensional feature.

3. The image processing apparatus according to claim 2, wherein the first discriminating method uses a texture feature as the high-dimensional feature.

4. The image processing apparatus according to claim 3, wherein the texture feature is at least one of an LBP feature, a gavor feature, and a texton feature.

5. The image processing apparatus according to claim 2, wherein the second discriminating method uses a feature based on a color or edge information as the low-dimensional feature.

6. The image processing apparatus according to claim 5, wherein the feature based on the color or edge information is at least one of an average value or dispersion value of the color, edge information of an area boundary, and an edge intensity average value or dispersion value in the area.

7. The image processing apparatus according to claim 1, wherein when a size of the area connected by the connecting unit is smaller than a predetermined value, the connected area and its adjacent area are set to new adjacent areas, and one of the plurality of discriminating methods is selected by the selecting unit.

8. The image processing apparatus according to claim 1, wherein:

the extracting unit extracts an area classification feature to classify the kind of the connected area from the area connected by the connecting unit; and the classifying unit classifies the kind of the connected area on the basis of the area classification feature.

9. An image processing method comprising:

a segmenting step of segmenting an input image into a plurality of areas on the basis of a similarity of pixels;

an acquiring step of acquiring sizes of the areas segmented in the segmenting step;

a selecting step of selecting one of a plurality of discriminating methods of discriminating, with respect to adjacent areas among the plurality of areas, on the basis of a size of each of the adjacent areas acquired in the acquiring step, whether or not the adjacent areas are connecting targets by using different kinds of features;

an extracting step of extracting, from the adjacent areas, the feature of the kind which is used in the discriminating method selected in the selecting step;

a connecting step of connecting the adjacent areas determined as connecting targets by the discriminating method selected in the selecting step; and a classifying step of classifying a kind of area connected in the connecting step.

10. A non-transitory computer-readable storage medium storing a program for causing a computer to execute each step of the image processing method according to claim 9.

* * * * *